United States Patent [19]
Sim et al.

[11] 3,900,559
[45] Aug. 19, 1975

[54] SUSTAINED RELEASE OF METHANTHELINE

[75] Inventors: James S. Y. Sim; Maurice H. Van Horn; Arthur I. Cohen; Stanley E. Gordesky; Stanley I. Gordon, all of Rochester, N.Y.

[73] Assignee: Union Corporation, Verona, Pa.

[22] Filed: Sept. 10, 1973

[21] Appl. No.: 395,668

[52] U.S. Cl.................................. 424/22; 424/81
[51] Int. Cl.²........................................ H61K 27/12
[58] Field of Search........................... 424/19–22, 424/81

[56] References Cited
UNITED STATES PATENTS
3,641,237  2/1972  Gould et al........................ 424/16
3,775,537  11/1973  Lehmann et al.................... 424/21

OTHER PUBLICATIONS

Stechor et al., Merck Index, 8th Ed., (1968), page 671 entry, "Methantheline Bromide".

*Primary Examiner*—Shep K. Rose
*Attorney, Agent, or Firm*—Pollock, Philpitt & Vande Sande

[57] ABSTRACT

A sustained release pharmaceutical composition which includes methantheline bromide and a polymer of a monomer mixture of a monoester of acrylic acid and/or methacrylic acid and a polyhydric alcohol; a heterocyclic polymerizable compound; another monoethylenically unsaturated ester; and divinyl benzene.

16 Claims, No Drawings

SUSTAINED RELEASE OF METHANTHELINE

BACKGROUND OF THE INVENTION

The present invention is concerned with a sustained release pharmaceutical composition, and in particular is concerned with a sustained release pharmaceutical composition which contains a water-insoluble but water-swellable hydrophilic polymer of a monomeric mixture containing a monoester of acrylic and/or methacrylic acid; a heterocyclic polymerizable compound, another monoethylenically unsaturated ester, and divinyl benzene.

It has previously been suggested to incorporate drugs into hydrophilic polymers to provide sustained release of the drug. Although a wide variety of suitable polymers and applicable drugs have previously been suggested, only a very limited number of combinations of particular drugs and particular polymers have to date been successful in providing sustained release characteristics. In addition, various combinations which provide sustained release require mixtures of two or more polymers in combination with the drug.

It has become quite evident that not any combination of any drug and any hydrophilic polymer will provide a sustained release pharmaceutical composition. The preparation of sustained release pharmaceutical compositions from only a polymer and a drug is highly empirical. The art has not advanced to the stage where a person skilled in the art can predict whether a particular combination of a drug and hydrophilic polymer will produce a sustained release pharmaceutical composition.

Accordingly, it is an object of the present invention to provide a suitable sustained release pharmaceutical composition. It is a further object of the present invention to provide a sustained release pharmaceutical composition which requires only the pharmacological material and the hydrophilic polymer and does not require the presence of auxiliary polymers.

SUMMARY OF THE INVENTION

The present invention is concerned with a sustained release pharmaceutical composition comprising:

A. a matrix of a water-insoluble but water-swellable hydrophilic polymer of a monomer mixture containing:
  1. polymerizable monoester of acrylic and/or methacrylic acid and a polyhydric alcohol;
  2. heterocyclic polymerizable compound containing a carbonyl functionality adjacent to the nitrogen in the heterocyclic ring and being selected from the group consisting of N-vinyl lactams, N-vinyl imidazolidone, N-vinyl succinimide, N-vinyl diglycolylimide, N-vinyl glutarimide, N vinyl-3-morpholinone, N-vinyl-5-methyl-3-morpholinone, and mixtures thereof;
  3. monoethylenically unsaturated esters selected from the group consisting of alkyl acrylates, alkyl methacrylates, vinyl esters of saturated monocarboxylic acids of up to 22 carbon atoms, and mixtures thereof, wherein the alkyl group of said methacrylate or acrylate contains from 1 to 22 carbon atoms; and
  4. divinyl benzene; and wherein the monomer mixture contains from about 75 to about 88 percent by weight of (1); from about 10 to about 20 percent by weight of (2); from about 1 to about 10 percent by weight of (3) and from about 1 to about 10 percent by weight of (4) based upon the total weight of (1), (2), (3), and (4) in the monomer mixture; and B. methantheline bromide in an amount at least sufficient for the total dosage requirement during a treatment period; and being entrapped in said matrix.

DESCRIPTION OF PREFERRED EMBODIMENTS

The polymerizable monoesters which are suitable in obtaining the polymers employed in the present invention must be water-miscible. Such polymerizable monoesters are monoesters of either acrylic and/or methacrylic acid and a polyhydric alcohol and preferably a dihydric alcohol. Suitable dihydric alcohols which may be employed to form the esters used in the present invention include among others ethylene glycol, 1,3-propanediol, the dialkylene glycols such as diethylene glycol and dipropylene glycol; and the polyalkylene glycols such as polyethylene glycol and polypropylene glycol; 1,6-hexamethylene glycol; and 1,4-butanediol. Some suitable polyhydric alcohols which contain from 3 to 6 alcohol groups and which may be employed to form the ester used in the present invention include glycerol, trimethylol propane, trimethylolethane, pentaerythritol, and hexitols such as mannitol and sorbitol. Examples of some suitable polymerizable monoesters include 2-hydroxy ethyl methacrylate, 2-hydroxy ethyl acrylate, 2-hydroxy propyl methacrylate, diethylene glycol monomethacrylate, diethylene glycol monoacrylate, 2-hydroxy propyl acrylate, 3-hydroxy propyl methacrylate, 3-hydroxy propyl acrylate, dipropylene glycol monomethacrylate, glyceryl methacrylate, and pentaerythritol methacrylate, with the preferred polymerizable monoester being 2-hydroxy ethyl methacrylate. The amount of polymerizable monoester employed in the monomeric mixture to prepare the polymers used in the present invention is usually from about 75 to about 88 percent by weight, and is preferably from about 80 to about 85 percent by weight, based upon the total weight of the polymerizable monoester; the heterocyclic polymerizable compound; the other unsaturated ester and the divinyl benzene. The most preferred amount of monoester is about 82 percent by weight based upon the total weight of the monoester, heterocyclic polymerizable compound, other unsaturated ester, and divinyl benzene.

The heterocyclic monomers which are suitable in the present invention must be water soluble and must contain a carbonyl functionality adjacent to the nitrogen in the heterocyclic ring. In addition, such monomers must contain a vinyl group bonded to a nitrogen atom of the heterocyclic ring. Also, the heterocyclic monomer should be capable of homopolymerizing to a water-soluble material.

Examples of some suitable heterocyclic monomers containing a carbonyl functionality adjacent to the nitrogen in the heterocyclic ring and containing a vinyl group pendent from a nitrogen in the heterocyclic ring include the lactams such as N-vinyl-2-pyrrolidone, N-vinyl-2-piperidone, and N-vinyl-e-caprolactam. In addition, the various lactams may be substituted in the lactam ring by one or more lower alkyl groups such as methyl, ethyl, or propyl. Other heterocyclic monomers which can be employed in the present invention include N-vinyl imidazolidone, N-vinyl succinimide, N-vinyl diglycolylimide, N-vinyl glutarimide, N-vinyl-3- morpholinone, and N-vinyl-5-methyl-3-morpholinone. Usually the heterocyclic compounds contain from about 3 to 6 carbon atoms in the ring. It is understood of course that mixtures of such heterocyclic compounds can be employed in preparing the water-swellable polymers used in the present invention.

The preferred heterocyclic compounds employed are the N-vinyl lactams of which N-vinyl-2-pyrrolidone is the most preferred.

The amount of heterocyclic monomer employed in the monomer mixture is usually from about 10 to about 20 percent by weight, is preferably from about 12 to about 18 percent by weight, and is most preferably about 15 percent by weight based upon the total weight of the monoester, heterocyclic monomer, other unsaturated monomer, and divinyl benzene in the monomer mixture.

The other monoethylenically unsaturated ester which may be employed in preparing the polymers employed in the present invention include the alkyl methacrylates, the alkyl acrylates, the vinyl esters of saturated monocarboxylic acids, and mixtures thereof.

Usually the alkyl radical of the methacrylate or acrylate contains up to 22 carbon atoms, and preferably contains from 1 to 5 carbon atoms. Some examples of methacrylates suitable for use in the present invention include methyl methacrylate, ethyl methacrylate, isopropyl methacrylate, butyl methacrylate, capryl methacrylate, palmityl methacrylate, stearyl methacrylate, and lauryl methacrylate. Some suitable acrylate esters include ethyl acrylate, methyl acrylate, isopropyl acrylate, butyl acrylate, and lauryl acrylate.

The vinyl esters suitable in the present invention include the vinyl esters of monocarboxylic acids wherein the acid contains up to about 22 carbon atoms. Some suitable vinyl esters include vinyl acetate, vinyl propionate, vinyl butyrate, vinyl stearate, and the vinyl ester of "Versatic" 911 acid which is a saturated synthetic tertiary monocarboxylic acid having $C_9$, $C_{10}$, and $C_{11}$ chain length. The most preferred vinyl ester is vinyl acetate.

The preferred unsaturated esters employed in the present invention are the methacrylates of which the most preferred is methyl methacrylate. The amount of unsaturated ester employed is usually between about 1 and about 10 percent by weight, and preferably between about 1 and about 5 percent by weight based upon the total weight of the monoester, heterocyclic polymerizable compound, other unsaturated ester, and divinyl benzene. The preferred amount of this unsaturated ester is about 2 percent by weight.

The amount of divinyl benzene employed is usually between about 0.1 and about 10 percent, preferably between about 0.2 and 2 percent, and most preferably about 0.6 percent by weight based upon the total weight of the monoester, heterocyclic polymerizable compound, other unsaturated ester, and divinyl benzene. The monomer mixture can contain from about 75 to about 82 percent or to about 80 percent by weight of the polymerizable monoester; from about 10 or from about 12 to about 15 percent by weight of the heterocyclic polymerizable compound; from about 1 to about 2 percent by weight of the monoethylenically unsaturated ester; and from about 0.1 or from about 0.2 to about 0.6 percent by weight of the divinyl benzene based upon the total weight of the polymerizable monoester, the heterocyclic polymerizable compound, the monoethylenically unsaturated ester compound, and the divinyl benzene in the monomer mixture.

Methantheline bromide, which is the drug employed according to the present invention, is generally used in amounts of about 0.1 to about 60 percent, preferably from about 0.5 to about 30 percent and most preferably from about 5 to about 20 percent by weight based upon the total weight of the methantheline bromide and the water-insoluble but water-swellable hydrophilic polymer. The water-insoluble but water-swellable hydrophilic polymer is generally employed in amounts of about 40 to about 99.9 percent, preferably from about 70 to about 99.5 percent by weight, and most preferably from about 80 to about 95 percent by weight based upon the total weight of the methantheline bromide and water-insoluble but water-swellable hydrophilic polymer.

In addition, the pharmaceutical compositions of the present invention can include such other materials as inert fillers and suspending aids such as Cab-O-Sil and bentone for the methantheline bromide.

Moreover, the compositions of the present invention can be further encapsulated by another polymeric or other film-forming substance according to particular applications of the composition. Such auxiliary encapsulating layers can be soluble or insoluble in aqueous medium, the solubility or swelling being dependent or independent of pH and/or ionic strength, and can be susceptible or nonsusceptible to enzymatic action.

The pharmaceutical compositions of the present invention can be prepared by admixing the methantheline bromide or an aqueous solution thereof and the monomeric mixture containing the polymerizable monoester, heterocyclic polymerizable compound, other unsaturated ester, and divinyl benzene; and then by polymerizing to provide a matrix of the water-insoluble but water-swellable polymer entrapping the methantheline bromide. The pharmaceutical compositions of the present invention can also be prepared by contacting methantheline bromide with the water-insoluble but water-swellable polymer such as by immersing the polymer in a bath such as an aqueous bath of the drug to cause diffusion of the methantheline bromide into the polymer matrix. Generally the methantheline bromide is contacted with the polymer for at least about 15 minutes to cause diffusion into the polymer matrix. Of course, this can vary greatly depending upon the relative amounts of the ingredients.

The water-swellable polymers employed in the present invention generally can be prepared by employing bulk polymerization techniques. The term "bulk polymerization" as used herein includes those polymerizations carried out in the absence of a solvent or dispersing liquid as well as those polymerizations carried out in the presence of water or water-soluble or polymer-soluble liquid swelling agents in such amounts as not to significantly alter the nature of the polymerization process.

The polymerization catalyst employed can be any of the catalysts which are suitable in polymerizing compounds containing ethylenic unsaturation and preferably are the free radical catalysts. Of particular interest are the peroxide catalysts. Some examples of suitable peroxide catalysts include hydrogen peroxide, benzoyl peroxide, tert-butyl peroctoate, phthalic peroxide, succinic peroxide, benzoyl acetic peroxide, tert-butyl peroxy pivalate, coconut oil acid peroxide, lauric peroxide, stearic peroxide, oleic peroxide, tert-butyl hydroperoxide, tetraline hydroperoxide, tert-butyl diperphthalate, cumene hydroperoxide, tert-butyl perbenzoate, acetyl peroxide, 2,4-dichlorobenzoyl peroxide, urea peroxide, caprylyl peroxide, p-chlorobenzoyl peroxide, ditert-butyl peroxide, 2,2-bis(tert-butyl peroxy)-butane, hydroxyheptyl peroxide, the diperoxide of benzaldehyde; alkylperoxycarbonates such as diisobutylperoxy bicarbonate, di-secondary butyl peroxy bicarbonate, and tert-butyl peroxyisopropylcarbonate, and the like. The preferred catalyst is one which is effective at moderately low temperatures such as at about 30°–90° C.

The amount of catalyst employed depends upon the type of catalyst system used and is generally from about 0.01 to about 10 parts by weight per 100 parts of the monomer mixture, and preferably is from about 0.1 to about 1 part by weight per 100 parts of the monomer mixture.

The polymerization is generally carried out at temperatures from about room temperature to about 150° C. It is generally preferred to initiate the polymerization at relatively low temperatures such as from about 35° to about 85° C and then to increase the temperature to about 90° to about 150° C as the reaction proceeds and preferably after most of the reaction has been completed. The most preferred initial temperature range of polymerization is between about 30° and 90° C.

Usually the polymerization is conducted under autogenous pressure in a closed reaction vessel. However, any suitable means to prevent significant evaporation of any of the monomers can be employed.

Generally, the polymerization is completed in about one-half to about 12 hours and preferably is completed in about 4 to about 6 hours. It is understood, of course, that the time and temperature are inversely related. That is, temperatures range employed at the upper end of the temperature range will provide polymerization processes which can be completed near the lower end of the time range.

In addition, it may be desirable for the copolymers obtained from such polymerizations to be post cured at temperatures somewhat higher than those initially employed in the polymerization. Usually the temperatures employed in the post cure will range from about 90° to about 150° C. Two hours is usually more than sufficient for such a post curing operation. Preferably the post cure is completed in 2 or 4 hours.

The pharmaceutical compositions of the present invention can be utilized for oral ingestion, implantation, or external application to a mucous membrane. The pharmaceutical compositions of the present invention can be implanted subcutaneously, constitute a part of a prosthesis, or be inserted in a cavity of the human body. Upon application to the desired part of the body by the desired mode, the pharmaceutical compositions of the present invention provide sustained release of the pharmacological material by diffusion through pores of the water-insoluble but water-swellable polymeric matrix to the desired part of the body upon contact with body fluids.

The present invention makes it possible to obtain a sustained release pharmaceutical composition which requires only the drug and the water-insoluble but water-swellable polymer and does not require the presence of auxiliary polymers. In addition, the sustained release characteristics of the present invention could not be predicted particularly since the polymers employed in this invention did not always provide sustained release compositions.

Moreover when methantheline bromide is employed together with other polymers, a sustained release composition is not always obtained.

The following example is presented to further illustrate the present invention. All parts are by weight unless the contrary is stated.

EXAMPLE 1

A polymeric composition is prepared by admixing about 26 parts of Cab-O-Sil EH5 and about 104 parts of a polymerizable composition containing about 82 percent by weight of 2-hydroxy ethyl methacrylate, and 15 percent by weight of N-vinyl-2-pyrrolidone, about 2 percent by weight of methyl methacrylate, and 0.6 percent divinyl benzene, and about 0.4 percent of tert-butyl peroctoate. The mixture is heated to 54° C for about 12 hours under a nitrogen atmosphere of 2 psi to effect polymerization. The mixture is then post cured under atmospheric pressure at 80° C for about 2 hours and then at 120° C for another 2 hours. The resulting polymeric composition is soaked for about 12 hours at ambient temperature in 5 ml of isotonic saline solution (0.9% NaCl) containing 100 mg of methantheline bromide per 5ml of saline solution. The above composition is introduced into a beaker containing 20 milliliters of isotonic saline solution (0.9% NaCl) and the beaker is shaken at a constant temperature of 37° C in a thermostatic water bath shaker. The concentration of eluted methantheline is determined with a Beckman DB-GT spectrophotometer using the maximum absorption of methantheline bromide at 282 nanometers. Elution rates are checked at the time intervals shown below and fresh isotonic saline solution is employed after each reading. The results are listed below.

| Hours | Mg of Methantheline Eluted | % of Total Amount Eluted |
|---|---|---|
| 1 | 6.303 | 36 |
| 2 | 2.228 | 13 |
| 3 | 1.527 | 9 |
| 4 | 1.169 | 7 |
| 5 | .924 | 5 |
| 6 | .808 | 5 |
| 7 | .685 | 4 |
| 24 | 3.507 | 20 |
| 25 | .288 | 2 |
| 26 | .159 | 1 |

What is claimed is:

1. A sustained release oral ingestion 26 hour methantheline eluting pharmaceutical composition consisting essentially of:

A. a polymerized and cured matrix of about 104 parts of a polymerizable composition consisting essentially of:

1. polymerizable monoester of a member selected from the group consisting of acrylic acid, methacrylic acid, and mixtures thereof; and a polyhydric alcohol;

2. heterocyclic polymerizable compound containing a carbonyl functionality adjacent to the nitrogen in the heterocyclic ring and being selected from the group consisting of N-vinyl lactams, N-vinyl imidazolidone, N-vinyl succinimide, N-vinyl diglycolylimide, N-vinyl glutarimide, N-vinyl-3-morpholinone, N-vinyl-5-methyl-3-morpholinone, and mixtures thereof;
3. monoethylenically unsaturated esters selected from the group consisting of alkyl acrylates, alkyl methacrylates, vinyl esters of saturated monocarboxylic acids of up to 22 carbon atoms, and mixtures thereof, wherein the alkyl group of said methacrylate or acrylate contains from 1 to 22 carbon atoms; and
4. divinyl benzene; and wherein the monomer mixture contains from about 75 to about 82 percent by weight of (1); from about 10 to about 15 percent by weight of (2); from about 1 to about 2 percent by weight of (3) and from about 0.1 to about 0.6 percent by weight of (4) based upon the total weight of (1), (2), (3), and (4) in the monomer mixture; in admixture with about 26 parts of finely divided absorptive siliceous, or calcareous inert filler and suspending aid for methantheline bromide;

B. said polymerized and cured matrix having been soaked for about 12 hours in an isotonic saline solution containing per 5 ml of isotonic saline solution at least about 100 mg of methantheline bromide in an amount at least sufficient for a total dosage requirement adapted to gradually elute, upon oral ingestion during 26 hours of a treatment period; and thereby entrapping the methantheline in said matrix.

2. The composition of claim 1 wherein said polymerizable monoester is a monoester of a member selected from the group consisting of acrylic acid, methacrylic acid, and mixtures thereof; and a polyhydric alcohol selected from the group consisting of ethylene glycol, 1,3-propanediol, diethylene glycol, dipropylene glycol, polyethylene glycol, polypropylene glycol, 1,6-hexamethylene glycol, 1,4-butanediol, glycerol, trimethylol propane, trimethylolethane, pentaerythritol, mannitol, and sorbitol.

3. The composition of claim 1 wherein said polymerizable monoester is selected from the group consisting of 2-hydroxy ethyl methacrylate, 2-hydroxy ethyl acrylate, 2-hydroxy propyl methacrylate, diethylene glycol monomethacrylate, diethylene glycol monoacrylate, 2-hydroxy propyl acrylate, 3-hydroxy propyl methacrylate, 3-hydroxy propyl acrylate, dipropylene glycol monomethacrylate, glyceryl methacrylate, and pentaerythritol methacrylate.

4. The composition of claim 1 wherein said monoester is 2-hydroxy ethyl methacrylate.

5. The composition of claim 1 wherein said monoethylenically unsaturated ester is selected from the group consisting of methyl methacrylate, ethyl methacrylate, isopropyl methacrylate, butyl methacrylate, capryl methacrylate, palmityl methacrylate, stearyl methacrylate, lauryl methacrylate, ethyl acrylate, methyl acrylate, isopropyl acrylate, butyl acrylate, lauryl acrylate, vinyl acetate, vinyl propionate, vinyl butyrate, vinyl stearate, and the vinyl ester of saturated synthetic tertiary monocarboxylic acid having $C_9$, $C_{10}$, and $C_{11}$ chain length.

6. The composition of claim 1 wherein said monoethylenically unsaturated ester is methyl methacrylate.

7. The composition of claim 1 wherein said heterocyclic polymerizable compound is selected from the group consisting of N-vinyl-2-pyrrolidone, N-vinyl-2-piperidone, N-vinyl-3-caprolactam, N-vinyl-imidazolidone, N-vinyl-succinimide, N-vinyl-diglycolylimide, N-vinyl-glutarimide, N-vinyl-3-morpholinone, N-vinyl-5-methyl-3-morpholinone, and mixtures thereof.

8. The composition of claim 1 wherein said heterocyclic polymerizable compound is a N-vinyl lactam.

9. The composition of claim 1 wherein said heterocyclic polymerizable compound is N-vinyl-2-pyrrolidone.

10. The composition of claim 1 wherein the monomer mixture contains about 82 percent by weight of (1); about 15 percent by weight of (2); about 2 percent by weight of (3); and about 0.6 percent by weight of (4) based upon the total weight of (1), (2), (3), and (4) in the monomer mixture.

11. The composition of claim 1 wherein (1) said polymerizable monoester if a monoester of a member selected from the group consisting of acrylic acid, methacrylic acid, and mixtures thereof; and a polyhydric alcohol selected from the group consisting of ethylene glycol, 1,3-propanediol, diethylene glycol, dipropylene glycol, polyethylene glycol, polypropylene glycol, 1,6-hexamethylene glycol, 1,4-butanediol, glycerol, trimethylol propane, trimethylolethane, pentaerythritol, mannitol, and sorbitol; wherein said monoethylenically unsaturated ester (2) is selected from the group consisting of methyl methacrylate, ethyl methacrylate, isopropyl methacrylate, butyl methacrylate, capryl methacrylate, palmityl methacrylate, stearyl methacrylate, lauryl methacrylate, ethyl acrylate, methyl acrylate, isopropyl acrylate, butyl acrylate, lauryl acrylate, vinyl acetate, vinyl propionate, vinyl butyrate, vinyl stearate, and the vinyl ester of saturated synthetic tertiary monocarboxylic acid having $C_9$, $C_{10}$, and $C_{11}$ chain length; and wherein said heterocyclic polymerizable compound is selected from the group consisting of N-vinyl-2-pyrrolidone, N-vinyl-2-piperidone, N-vinyl-3-caprolactam, N-vinyl-imidazolidone, N-vinyl-succinimide, N-vinyl-diglycolylimide, N-vinyl-glutarimide, N-vinyl-3-morpholinone, N-vinyl-5-methyl-3-morpholinone, and mixtures thereof.

12. The composition of claim 11 wherein said polymerizable monoester is selected from the group consisting of 2-hydroxy ethyl methacrylate, 2-hydroxy ethyl acrylate, 2-hydroxy propyl methacrylate, diethylene glycol monomethacrylate, diethylene glycol monoacrylate, 2-hydroxy propyl acrylate, 3-hydroxy propyl methacrylate, 3-hydroxy propyl acrylate, dipropylene glycol monomethacrylate, glyceryl methacrylate, and pentaerythritol methacrylate.

13. The composition of claim 12 wherein the monomer mixture contains from about 80 to about 82 percent by weight of (1); from about 12 to about 15 percent by weight of (2); from about 1 to about 2 percent by weight of (3); and from about 0.2 to about 6 percent by weight of (4) based upon the total weight of (1), (2), (3), and (4) in the monomer mixture.

14. The composition of claim 1 wherein said monoester (1) is 2-hydroxy ethyl methacrylate, said heterocyclic polymerizable compound (2) is N-vinyl-2-pyrrolidone and said monoethylenically unsaturated ester (3) is methyl methacrylate.

15. The composition of claim 14 wherein the monomer mixture contains from about 80 to about 85 percent by weight of (1); from about 12 to about 15 percent by weight of (2); from about 1 to about 2 percent by weight of (3); and from about 0.2 to about 0.6 percent by weight of (4) based upon the total weight of (1), (2), and (3) in the monomer mixture.

16. The composition of claim 14 wherein the monomer mixture contains about 82 percent by weight of (1); about 15 percent by weight of (2); about 2 percent by weight of (3); and about 0.6 percent by weight of (4) based upon the total weight of (1), (2), (3), and (4) in the monomer mixture.

* * * * *